J. C. VOGEL.
GROUNDING DEVICE.
APPLICATION FILED MAY 29, 1914.
1,288,303.
Patented Dec. 17, 1918.
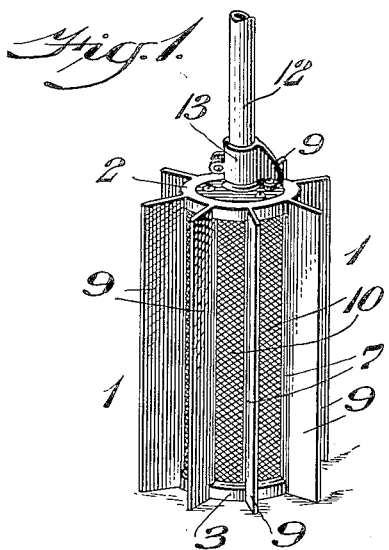
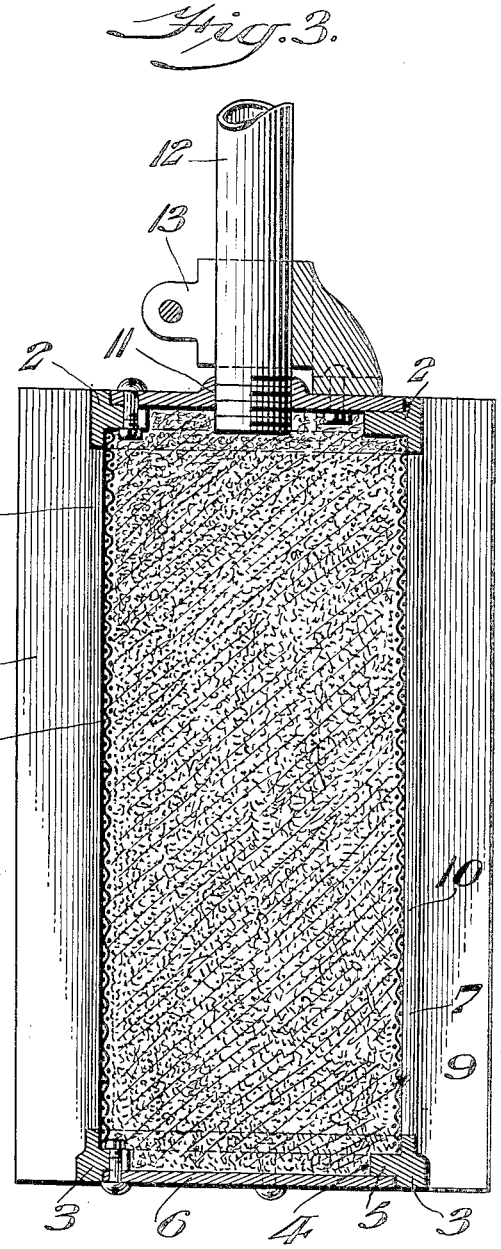
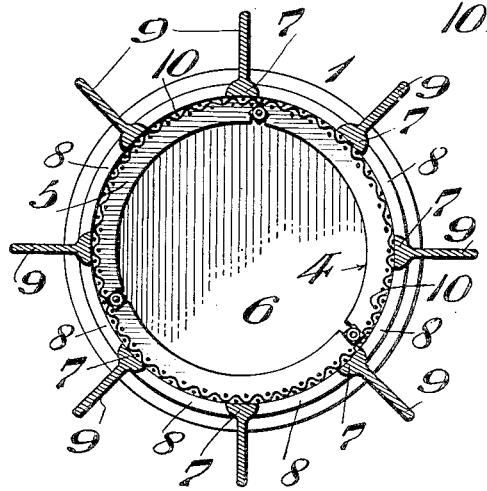
WITNESSES
H. G. Dieterich
P. F. Nagle
INVENTOR
John C. Vogel.
BY Wiedersheim & Fairbanks
ATTORNEYS

UNITED STATES PATENT OFFICE.

JOHN C. VOGEL, OF PHILADELPHIA, PENNSYLVANIA.

GROUNDING DEVICE.

1,288,303.  Specification of Letters Patent.  Patented Dec. 17, 1918.

Application filed May 29, 1914. Serial No. 841,808.

*To all whom it may concern:*

Be it known that I, JOHN C. VOGEL, a citizen of the United States, residing in the city and county of Philadelphia, State of Pennsylvania, have invented a new and useful Grounding Device, of which the following is a specification.

My invention relates to a new and useful grounding device which can be used for grounding various electrical conductors in various circuits and electrical systems or terminals for line wires, and consists of a receptacle or box adapted to receive and retain a suitable hygroscopic compound and keeping the same practically in free communication with the strata of earth surrounding the box.

It further consists of means for holding the earth around the box in substantial contact with the compound.

It further consists of longitudinally extending ribs or flanges extending outwardly beyond the wall of the box.

It further consists of other novel features of construction, all as will be hereinafter fully set forth.

For the purpose of illustrating my invention, I have shown in the accompanying drawing one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a grounding device embodying my invention.

Fig. 2 represents a horizontal, sectional view thereof on an enlarged scale.

Fig. 3 represents a vertical sectional view thereof on an enlarged scale.

Similar numerals of reference indicate corresponding parts in the figures.

Referring to the drawings:—

1 designates the grounding device or box which consists preferably of a hollow metal shell, which is preferably cylindrical but can be formed of any desired shape and material. The box consists of a top, 2, and a bottom, 3, which is preferably formed with an opening, 4, and is provided with a flange, 5, providing a suitable recess, for receiving the cap or closure 6 for the bottom and which is adapted to be secured in any suitable or desired manner thereto. As here shown, the top 2 and bottom 3 are connected by bars, 7, spaced apart to form longitudinally extending slots or openings 8 therebetween, while projecting outwardly from the wall of the box, in the present instance beyond the diameter thereof are the ribs or flanges 9. Within the casing is supported a screen, 10, which is adapted to receive and retain a hygroscopic compound, so that the same can be carried by the box or receptacle, but by reason of the meshes of the screen and the slots or openings 8, the said compound is practically in free communication with the strata of earth surrounding the box when the same is embedded in the ground. The top plate 2 is provided with an opening, 11, for receiving a metal pipe 12, and carried by said top 2 is a coupling, 13, adapted to engage with and securely hold said pipe.

It will be understood that the said pipe acts as a conductor and carries the current down from the point of connection to the box, and by employing a pipe in place of a wire or other solid conductor, a better carrying surface is provided, as the current, such as lightning, will flow along an open pipe better than through a solid conductor. By forming the outwardly extending ribs or flanges on the box, the earth can be packed in between the same, substantially in contact with the wire screen, so that the heat radiation will be carried off more readily in cases of excessive current. In addition, the construction permits the minimum size of a box with a maximum surface, so that the current density per unit area for any given discharge is reduced to a very small amount. This feature is of particular importance where continuous or recurrent charges of long duration are experienced.

In cases where the current density is high due to too small an area of contact surface, the heating effect is sufficient to rapidly drive off the moisture that supports conduction and this renders the ground inoperative. In the present construction, this is obviated as in actual practice the grounding boxes have shown a very high ampere hour capacity even under heavy discharge rates without any apparent increase in resistance due to local heating. By this construction moisture to the earth immediately surrounding the ground connection is properly supplied.

Having thus described my invention, what I claim as new and desire to secure by Letters Patent, is:—

1. In a device of the character stated, a box having longitudinally extending slots, and ribs extending radially outward from the wall of said box.

2. In a device of the character stated, a box having longitudinally extending slots, ribs extending radially outward from the wall of said box, and a screen within said box.

3. In a device of the character stated, a box having a top and bottom, spaced ribs connecting the same, and extending radially outward from the wall of said box.

4. In a device of the character stated, a box having a top and an open bottom, spaced ribs connecting the same, a screen within said box, and a removable closure for said bottom.

5. In a device of the character stated, a box having a top and an open bottom, spaced ribs connecting the same, a screen within said box, a removable closure for said bottom, and conductor connecting means carried by the box.

6. A device of the character stated, comprising a receptacle formed of a top, bottom and a screen forming a foraminous wall, hygroscopic material within the receptacle, spaced projections extending outwardly from said foraminous wall and independent of said screen, and a conducting pipe suitably connected with the receptacle and extending into the compound therein.

7. In a device of the character stated, a box provided with suitable openings and spaced projections extending outwardly beyond the exterior of the box and longitudinally thereof throughout the greater portion of the length of said box.

8. A device of the character stated, comprising a receptacle, a screen within said receptacle and forming a foraminous wall, and projections extending outwardly beyond the surface of the wall and longitudinally of the receptacle.

9. A device of the character stated, comprising a receptacle having projections extending outwardly beyond the surface of the receptacle and forming openings, and a screen covering said openings.

10. In a device of the character stated, a box having projections extending beyond the surface of the box and forming openings, a screen covering said openings, and means to connect a conductor with said box.

JOHN C. VOGEL.

Witnesses:
 C. D. McVay,
 F. A. Newton.